United States Patent
Weiss et al.

(10) Patent No.: US 10,171,575 B2
(45) Date of Patent: Jan. 1, 2019

(54) DYNAMIC ALLOCATION OF A QUOTA OF CONSUMER NODES CONNECTING TO A RESOURCE NODE OF A PEER-TO-PEER NETWORK

(75) Inventors: Eran Weiss, Ramat Gan (IL); Omer Luzzatti, Tel-Aviv (IL)

(73) Assignee: OATH INC., New York, NY (US)

( * ) Notice: Subject to any disclaimer, the term of this patent is extended or adjusted under 35 U.S.C. 154(b) by 372 days.

(21) Appl. No.: 13/167,371

(22) Filed: Jun. 23, 2011

(65) Prior Publication Data

US 2011/0258259 A1 Oct. 20, 2011

Related U.S. Application Data

(63) Continuation of application No. 12/244,756, filed on Oct. 2, 2008, now Pat. No. 7,996,546.

(51) Int. Cl.
    H04L 29/04 (2006.01)
    H04L 29/08 (2006.01)
    H04L 29/06 (2006.01)

(52) U.S. Cl.
    CPC .......... H04L 67/104 (2013.01); H04L 65/80 (2013.01); H04L 67/1085 (2013.01); H04L 65/4076 (2013.01); H04L 65/4084 (2013.01); H04L 67/125 (2013.01)

(58) Field of Classification Search
    CPC . H04L 67/104; H04L 67/125; H04L 65/4076; H04L 65/4084
    USPC ....... 709/203, 217, 219, 223, 224, 225, 226, 709/227, 228, 229
    See application file for complete search history.

(56) References Cited

U.S. PATENT DOCUMENTS

| | | | |
|---|---|---|---|
| 6,377,548 B1* | 4/2002 | Chuah | H04L 12/2602 370/233 |
| 6,662,230 B1* | 12/2003 | Eichstaedt | G06F 21/62 709/217 |
| 6,983,326 B1 | 1/2006 | Vigue et al. | |
| 7,062,555 B1 | 6/2006 | Kouznetsov et al. | |
| 7,174,385 B2 | 2/2007 | Li | |
| 7,209,973 B2 | 4/2007 | Tormasov et al. | |

(Continued)

FOREIGN PATENT DOCUMENTS

| WO | 2007/110865 | 10/2007 |
| WO | 2008/038280 | 4/2008 |

OTHER PUBLICATIONS

D. Xu, M. Hefeeda, S. Hambrusch, and B. Bhargava. On Peer-to-Peer Media Streaming. Purdue Computer Science Technical Report, Apr. 2002, pp. 1-10.*

(Continued)

*Primary Examiner* — Barbara B Anyan
(74) *Attorney, Agent, or Firm* — James J. DeCarlo; Greenberg Traurig, LLP

(57) ABSTRACT

A method for dynamically allocating upload bandwidth to consumer nodes by a resource node that are communicatively connected by a channel-swarm in a peer-to-peer network. The method comprises periodically computing a dynamic quota value to determine a number of acceptable connections between the resource node and one or more of the consumer nodes connected by the channel-swarm; and allocating an available upload bandwidth to the one or more of the consumer nodes in the channel-swarm based on the computed dynamic quota value.

12 Claims, 3 Drawing Sheets

(56) References Cited

U.S. PATENT DOCUMENTS

| | | |
|---|---|---|
| 7,836,184 B2 | 11/2010 | Luzzatti et al. |
| 7,945,694 B2 | 5/2011 | Luzzatti et al. |
| 2002/0161898 A1 | 10/2002 | Hartop et al. |
| 2004/0236863 A1 | 11/2004 | Shen et al. |
| 2005/0216559 A1 | 9/2005 | Manion et al. |
| 2006/0007947 A1 | 1/2006 | Li et al. |
| 2006/0224687 A1 | 10/2006 | Popkin et al. |
| 2006/0242315 A1 | 10/2006 | Nichols |
| 2007/0130361 A1* | 6/2007 | Li ................ H04L 65/4084 709/231 |
| 2007/0211677 A1 | 9/2007 | Laroia et al. |
| 2007/0233840 A1* | 10/2007 | Alstrup ............ H04L 67/104 709/223 |
| 2008/0133767 A1* | 6/2008 | Birrer ............. H04L 65/4076 709/231 |
| 2008/0134258 A1 | 6/2008 | Goose et al. |
| 2008/0320087 A1* | 12/2008 | Horvitz ........... H04L 67/125 709/206 |
| 2009/0182815 A1* | 7/2009 | Czechowski, III ... H04L 67/104 709/206 |
| 2010/0030909 A1* | 2/2010 | Magharei ......... H04L 29/06027 709/231 |

OTHER PUBLICATIONS

Mohamed Hefeeda et al., "Promise: Peer-to-Peer Media Streaming Using CollectCast"; Proceedings of the 11th ACM International Conference on Multimedia; ACM Multimedia 2003, Berkeley, CA; Nov. 4, 2003.

Dongyan Xu et al., "On Peer-to-Peer Media Streaming"; Department of Computer Sciences, Purdue University,West Lafayette, IN 47907; 2002.

Xinyan Zhang et al., "CoolStrearning/DONet: A Data-Driven Overlay Network for Efficient Live Media Streaming"; Department of Information Engineering, The Chinese University of Hong Kong, Shatin, N.T., Hong Kong; 2004.

* cited by examiner

DYNAMIC ALLOCATION OF A QUOTA OF CONSUMER NODES CONNECTING TO A RESOURCE NODE OF A PEER-TO-PEER NETWORK

CROSS-REFERENCE TO RELATED APPLICATIONS

This application is a continuation application of U.S. patent application Ser. No. 12/244,756, filed on Oct. 2, 2008, now allowed, which is incorporated herein in its entirety by reference thereto.

TECHNICAL FIELD

The present invention relates generally to content delivery in a peer-to-peer network, and more specifically to a method of per peer allocation of bandwidth quota for a delivery of content between the peers.

BACKGROUND OF THE INVENTION

The ubiquity of the Internet enables new techniques adaptation to enable direct distribution of multimedia files and real-time media streaming to end-users in an electronic format. The advantages associated with electronic distribution allow media content providers to establish global distribution systems for digital content. Furthermore, new compression algorithms, designed specifically for multimedia data, dramatically reduce the bandwidth and storage space required for the electronic distribution of multimedia data. This, together with the availability of broadband communication, encourages content providers to adopt the Internet as an alternate distribution system complementing the conventional distribution systems (e.g., cable or satellite TV).

Peer-to-peer (P2P) or grid networks enable the distribution of media between users without using server centric solutions. As an example, P2P file sharing systems are well known in the industry and use a very efficient technology to deliver media. Examples for such P2P systems are BitTorrent® and Gnutella. However, these systems do not distribute the content in real-time. Rather, a user can download the content (files) and view it only when the download has completed, i.e., a user cannot view the file while downloading it.

Recently, new systems for real-time streaming over P2P networks have been developed. Examples for such systems may be found in "A Data Driver Overlay Network for Efficient Live Media Streaming" by Zhang, et al. and in "P2P Media Streaming", by Hefeeda, et al., both of which are incorporated herein by reference merely for the useful understanding of the background of the invention. Real-time streaming systems fail to fully utilize the network's resources, as they do not consider the asymmetric nature of the nodes (peers) in a typical Internet protocol (IP) network. Generally, such systems consider the upload bandwidth of nodes as equal to the download bandwidth. This is rarely the case in IP networks, such as asymmetric digital subscriber line (ADSL) and cable based networks, as in most cases a node's upload bandwidth is half or less of the download bandwidth. Another type of real-time P2P network for distributing media can be found in PCT application number PCT/IL2007/000392 entitled "Realtime Media Distribution in a P2P Network", by Omer Luzzatti, et al. (hereinafter "Luzzatti") which is assigned to common assignee and incorporated herein by reference merely for the useful understanding of the background of the invention. Luzzatti discloses a real-time P2P network where nodes in the network can act in the role of 'amplifiers' to increase the total available bandwidth made available in the network and thus to improve the quality of the media consumed by the viewers.

When one peer in the peer-to-peer network is designated to provide content to a plurality of other peers that are connected to the delivering peer node, there may be differences in bandwidth requirement for each of the receiving peers due to many reasons. These include bandwidth limitations resulting from the output bandwidth of the delivering node, the bandwidth limitations of each receiving node, as well as limitation of various units that are placed in between the delivering node in the peer-to-peer network and the receiving nodes of the peer-to-peer network.

Techniques for allocating resources in a real-time peer-to-peer network are discussed in a co-pending U.S. patent application Ser. No. 12/120,652, filed on May 15, 2008, entitled "A Method for Managing the Allocation of Resources to Channel Swarms in a Peer-to-Peer network" and in a PCT application PCT/IL2007/001187 entitled "System and Methods for Peer-To-Peer Media Streaming", filed on Sep. 25, 2007, each of which is assigned to common assignee and incorporated herein by reference merely for the useful understanding of the background of the invention.

Prior art solutions typically either arbitrarily allocate a quota for delivery to each of the receiving nodes or divide the available bandwidth between the receiving nodes of the peer-to-peer network. However, this does not necessarily provide a good solution for systems where a receiving node may be joining or disconnecting from the system. It would further be problematic for networks where network conditions change, which is a typical occurrence in today's complex and heavily loaded networks.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

SUMMARY OF THE INVENTION

Figure 1:
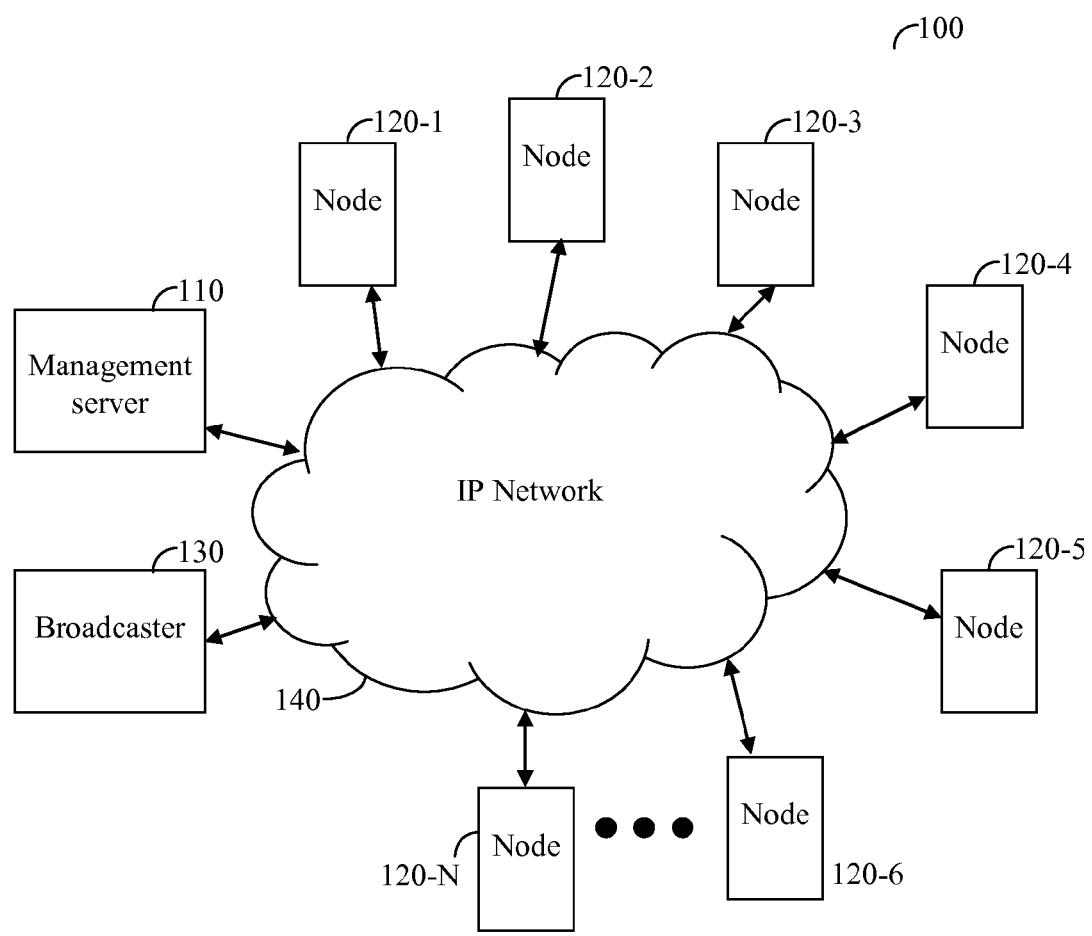
FIG. 1 is a diagram of a P2P network used to describe the principles of the invention.

Certain embodiments of the invention include a method, tangible computer readable medium, system, and resource node adapted to dynamically determine a maximum quota of consumer nodes it is willing to allow connections from. Accordingly, the resource node periodically determines the maximum number of consumer nodes it expects to service based on quality parameters. Until the maximum number of consumer nodes is reached, the resource node allows additional consumer nodes to connect for the purpose of receiving content. In addition, the resource node periodically checks the connection to each of the consumer nodes and determines for each the quality of service it is receiving. If the connections are bad then the quota is reduced, in steps, down to a minimum. Conversely, if the consumer node waits for delivery of content, than its quota is increased, in steps, up to a maximum bandwidth quota.

DETAILED DESCRIPTION OF THE INVENTION

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments of the invention include a method for determining a quota for connecting a plurality of consumer nodes to a resource node. The method comprises periodically determining the quota of consumer nodes acceptable for receiving connection requests by the resource node; receiving a connection request from a consumer node to connect to the resource node; and determining based on the quota whether to accept the connection request. In one embodiment the resource node and the consumer nodes are connected in a real-time peer-to-peer network, and the resource node is adapted to distribute multimedia content to the consumer nodes over the network.

Reference is now made to FIG. 1 that shows a non-limiting and exemplary block diagram of a P2P network 100 used to describe the principles of the invention. The P2P network 100 includes a plurality of nodes (peers) 120 and a broadcaster 130, all of which communicate with each other over an Internet protocol (IP) network 140. The P2P network 100 may further include a centralized management server 110. The P2P network 100 is utilized to distribute content in several parallel (and alternative) "channels". For example, the P2P network 100 may distribute several unrelated channels (e.g., TV-like channels) of real-time streaming media, with viewers who can choose to view one particular stream at a time.

The nodes 120 distributing the content of a particular channel constitute a "channel swarm". The nodes 120 may be, but are not limited to, personal computers, servers, portable media devices, media control devices, set-up boxes, or any other device capable of exchanging data with other nodes connected to it. A node may also refer to a module of a software system such as a media player application. Each node 120 can act as a consumer-node and/or a resource-node.

A consumer-node is a node 120-c (where c is an integer greater than or equal to 1) that belongs to an end-user who wants to watch a channel (i.e., to consume the real-time content). Each consumer-node is constrained to join one or more channel-swarms as determined by the end-user, and must receive a complete, consumable stream of the real-time content. An end-user can view media content broadcasted in a channel on a display connected to the consumer-node. This includes, but is not limited to, a TV screen connected to a set-up box or a monitor connected to a personal computer.

A resource-node is a node 120-r (where r is an integer greater than or equal to 1) with an available upload bandwidth that can be contributed to the one or more channel-swarms. In accordance with one embodiment a resource-node may be a dedicated network device that shares its bandwidth, but does not consume the media. Such devices are typically installed by service providers. A resource-node may be also an amplifier as described in greater detail in Luzzatti. It should be noted that different resource-nodes may have different capabilities, and in particular may be differently capable of providing resources to different consumer-nodes. The allocation of particular resource-nodes to a channel should be chosen to guarantee a certain quality of service, while minimizing the overhead associated with joining a channel swarm.

In accordance with an embodiment of the invention, a node 120 communicates with each and other and with the management server 110 using, for example, a computer program executed over the node. The management server 110 is preferably a distributed, scalable, hardware independent system that executes the tasks related to the management of the real-time distribution of media content over the P2P network 100. The management server 110 typically provides channel and peering information to nodes 120. For example, such information may include a list of channels that a node 120 may join based on information collected from the network or predicated behavior of channels.

The IP network 140 may be any type of synchronous or asynchronous packet-based network, including, but not limited to, wireless networks that are capable of carrying data information. The broadcaster 130 originates the live stream that, together with a set of resource-nodes 120-r, participate in the transmission of a TV-like channel media or other type of media to create a channel swarm. A channel swarm also includes a set of consumer-nodes which consume the media. It should be noted that a resource node and/or a consumer-node may be parts of other channel swarms.

Figure 2:
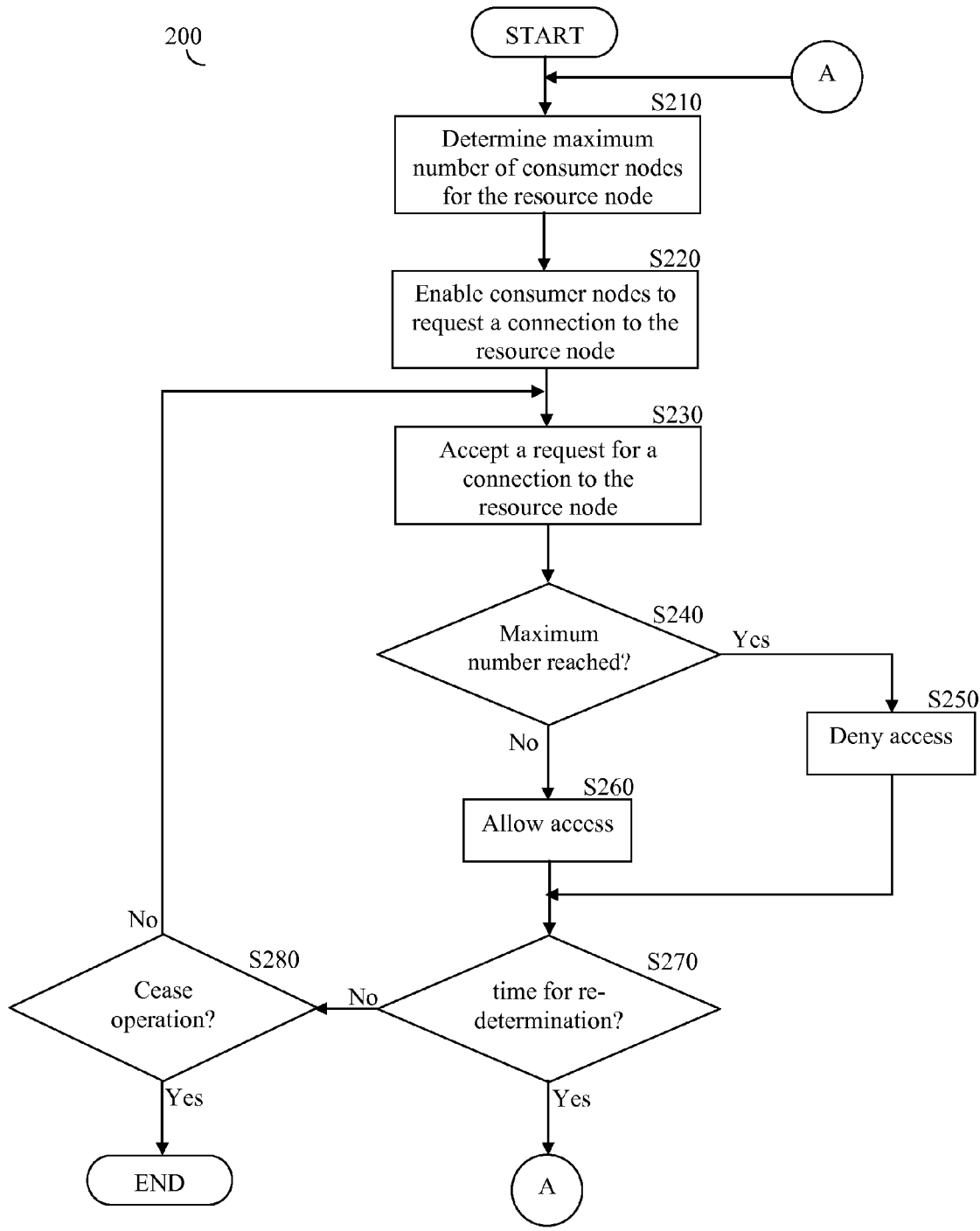
FIG. 2 is a flowchart describing the quota control performed in accordance with the principles of the invention.

Referring now to FIG. 2, an exemplary and non-limiting flowchart 200 shows the quota control performed in accordance with an embodiment of the invention. In S210 a resource node 120-r determines the maximum number of consumer nodes 120-c that may connect to a resource node 120-r. The initial value may be an arbitrary value. Such a value that may be determined by dividing a bandwidth requirement equally, which in return determines the number of consumer nodes 120 or other ways of assigning the initial quota value. As noted above any one of the plurality of consumer nodes 120 may function as a resource node. In S220 the resource node 120-r is enabled to accept connection requests from consumer nodes 120-c. In S230 the resource node receives a request for a connection from a consumer node 120-c. In S240 it is checked if the maximum number of consumer node 120-c connections has been reached and if so execution continues with S250; otherwise, execution continues with S260.

In S250 a request to receive content from the resource node 120-r by a requesting consumer node 120-c is denied due to exceeding the maximum number of permitted connections; execution continues with S270. In S260 access by the requesting consumer node 120-c is granted as the quota was not yet reached. In S270 it is checked if the time period has come to re-determine connection parameters for resource node 120-r, and if so execution continues with S210; otherwise, execution continues with S280. In S280 it is checked whether it is necessary to cease operation, and if so execution terminates; otherwise, execution continues with S230. While a certain order or steps has been shown hereinabove, other orders are possible without departing from the spirit of the disclosed invention.

Figure 3:
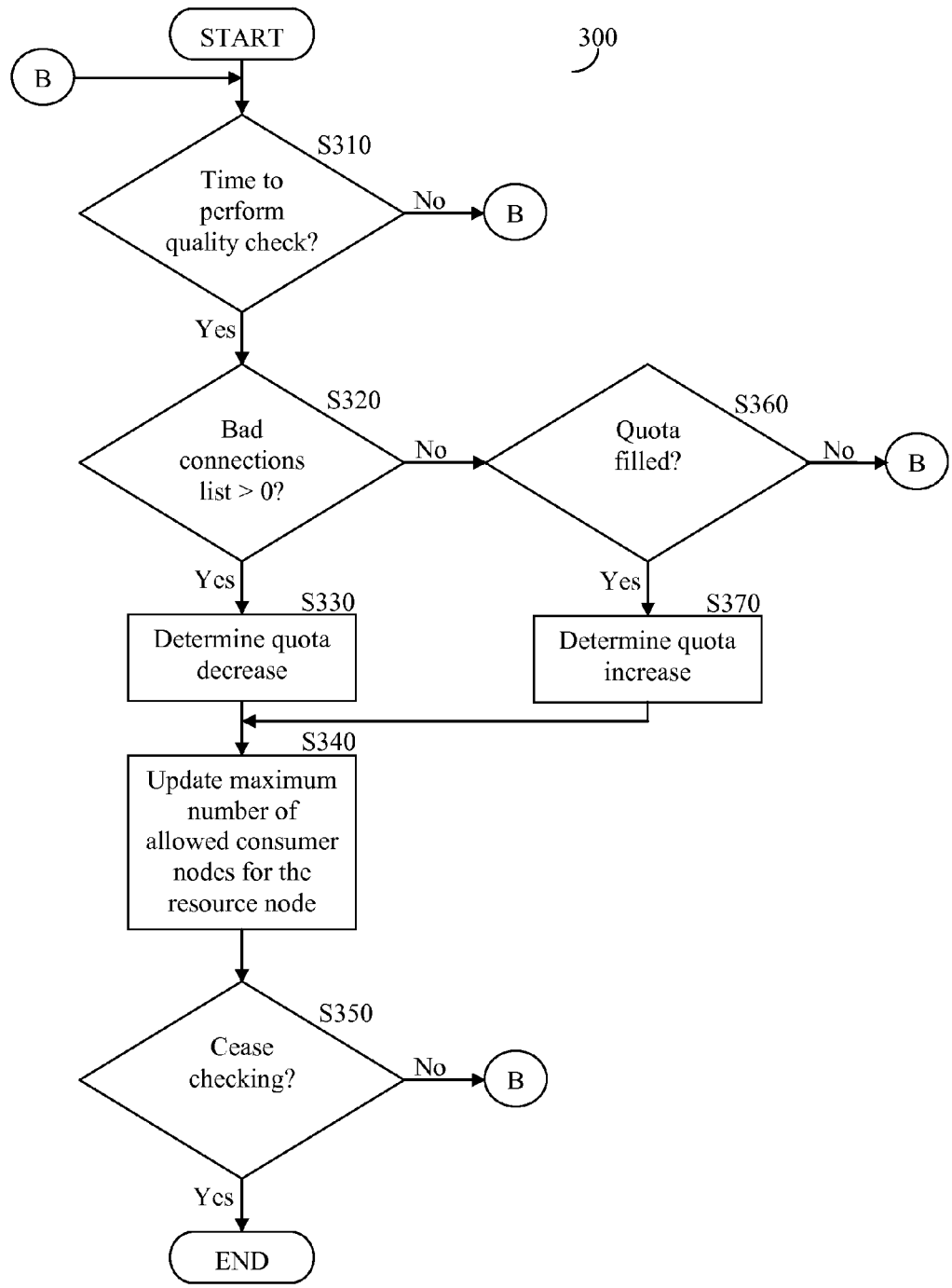
FIG. 3 is a flowchart describing the quota decrease or increase according to the principles of the invention.

In FIG. 3 there is shown an exemplary and non-limiting flowchart 300 describing the quota decrease or increase according to an embodiment of the invention. In S310 it is checked whether it is time to perform a quality check, and if so execution continues with S320; otherwise, execution continues with S310. In S320 it is checked whether a bad connections list for the consumer nodes contains one or more consumer nodes and if so execution continues with S330; otherwise, execution continues with S360.

In S330 a decreased quota value for the resource node 120-$r$ is determined. Furthermore, it is possible to cause the resource node 120-$r$ to drop the connection of certain consumer nodes 120 already connected to the resource node 120-$r$. In S370, the quota increase value is determined and execution continues with S340. In S340 the maximum quota value is updated. The resource node 120-$r$ may use the updated quota value when controlling the quota as performed by a resource node.

It should be noted that the bad connections list is reset for future determination. The list is updated periodically based on determination of the connection condition between each consumer node 120-$c$ and the resource node 120-$r$. Each resource node 120-$r$ maintains such a list for its own management purposes, thereby being independent for the determination of the quota from other resource or management nodes of the P2P network. It should be appreciated that various techniques can be utilized for the determination of the quota, one of which is described herein below.

In S350 it is checked if the method should cease checking if the quota value should be updated, and if so execution terminates; otherwise, execution continues with S310. In S360 it is checked if the allocated quota was filled and if not, execution continues with S310; otherwise, execution continues with S370. In S370 the increased quota is determined after which execution continues with S340. Both increase of quota and decrease of quota may be done in a plurality of ways and non-limiting examples are provided herein below.

Following is an exemplary and non-limiting description of an embodiment of the methods of the invention. The method has the following variables:

"quota" is the current maximum limit of number of acceptors;

"num_acc" is current number of acceptors, typically maintained by outside process (PC);

"wait_cycles" is the number of quality check cycles to ignore;

"last_drop" is time of last drop;

"filled_quota" holds the current quota been filled ever; and

"quota_full" is time of filling of quota.

To allow consumer nodes 120 to connect to a resource node 120-$r$, then, upon a request from a consumer node 120-$c$, if quota is larger than num_acc plus one then, the variable quota_full is loaded with the current time and the variable filled_quota is changed to true. Thereupon the connection of the consumer node 120-$c$ to the resource node 120-$r$ is allowed. Otherwise, if quota is not larger than num_acc plus one, then the connection between the requesting consumer node 120-$c$ and the resource node 120-$r$ is not allowed.

A quota that is the number of consumer nodes 120 that can connect to a give resource node 120-R has to be determined, as noted above. The following parameter values are set, however, these values should be understood to be exemplary and non-limiting values and they may be changed without departing from the scope of the disclosed invention. The initial value for the quota INIT_QUOTA is set to '2'; for the minimum quota MIN_QUOTA is set to '1'; the maximum quota value MAX_QUOTA is set to '10,000'; the period of time between checks to check on the quality of service QUALITY_CHECK_TIME is set to '500 milliseconds'; the drop ratio of a consumer node 120-$r$ ACCEPTOR_DROP_RATIO is set to '0.5'; the number of wait cycles for quality determination QUALITY_WAIT_CYCLES is set to '3'; the increase check time INCREASE_CHECK_TIME is set to '500 milliseconds'; the increase delay INCREASE_DELAY is set to '30,000 milliseconds'; and, the increase ratio INCREASE_RATIO is set to '0.25'. Then, during every QUALITY_CHECK_TIME period if wait_cycles is greater than zero then wait_cycles is decreased by one; otherwise, a list is created to contain a reference to those consumer nodes considered to be in bad standing. Such a bad standing can be a result of monitoring the connection conditions requiring the use of lower transmission speed, and others as may be applicable.

If the list contains at least one entry then several actions take place: the last_drop variable receives the current time value; the num_drop value receives the ceiling value of the multiplication of the number of bad consumer nodes 120-$c$ found in bad_acceptors_list and the ACCEPTOR_DROP_RATIO; from the consumer nodes 120 in the list bad_acceptors_list a number equal to the value of num_drop are dropped from being in communication with the resource node 120-$r$; the quota value is reduced by the value of num_drop; if the value of quota is less than the value of MIN_QUOTA then quota receives the value of MIN_QUOTA, therefore, in this case, as MIN_QUOTA has a value set to '1' it prevents the resource node 120-$r$ from not servicing any consumer node 120-$c$; and, the value of the wait_cycles returns back to the initialization value QUALITY_WAIT_CYCLES.

From time-to-time, in accordance with the principles of the invention it may be possible to increase the number of consumer nodes 120 connected to a resource node 120-$r$. This may be done periodically, for example, every INCREASE_CHECK_TIME period of time. At such time, if the value of filled_quota is true; the current time minus the value of quota_full is greater than the value of INCREASE_DELAY; and, the current time minus the value of last_drop is greater than the value of INCREASE_DELAY, then it is possible to increase the quota. This is done by setting the value of filled_quota to 'false'; adding to the current value of quota the ceiling value of the value of quota multiplied by the value of INCREASE_RATIO; and, if the value of quota is greater than the value of MAX_QUOTA then forcing the value of quota to MAX_QUOTA, thereby ensuring that the maximum quota for a specific resource node 120-$r$ will not be above a certain number, which is in the instant example the value of '10,000'.

The principles of the invention may be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPUs"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included.

What we claim is:

1. A method comprising:
periodically computing, by a resource node associated with a computing device, a dynamic quota value associated with a channel-swarm in a peer-to-peer network that is dynamically updated based on current connectivity values of each channel in the channel-swarm that are independent from connectivity conditions of the peer-to-peer network, said channel-swarm comprising a plurality of nodes, a portion of said plurality functioning as consumer nodes and a portion functioning as resource nodes, said resource node providing content to said one or more consumer nodes in the channel-swarm according to said dynamic quota value, said dynamic quota value comprising an indication of an acceptable number of connections between the resource node and the one or more consumer nodes, said resource node being a node in the peer-to-peer network that has contributable available bandwidth for said channel swarm, said resource node does not consume real-time multimedia content in said channel swarm,
said computing the dynamic quota value comprising:
reducing the dynamic quota value upon a determination that at least one of the connections between the resource node and any one of the consumer nodes is a bad connection, the quota reduction further comprising:
determining a step down value from the dynamic quota value, and
updating the dynamic quota by the step down value, and
increasing the dynamic quota value upon a determination that no bad connection with any of the consumer nodes has been encountered during a predefined time interval prior to the increasing of the dynamic quota value, the quota increase further comprising:
determining a step up value from the dynamic quota value; and
updating the dynamic quota value by the step up value; and
allocating, via the resource node, an available upload bandwidth to the one or more of the consumer nodes based on the dynamic quota value.

2. The method of claim 1, wherein allocating the available upload bandwidth includes:
accepting a connection request from a consumer node if the dynamic quota value is not filled out; and
rejecting a connection request from a consumer node if the dynamic quota value is filled out.

3. The method of claim 1, wherein if the dynamic quota value is below a minimum quota value, the minimum quota value is used as a value of the dynamic quota value, wherein the minimum quota is equal to or greater than one, thereby preventing the resource node from not servicing at least one of the consumer nodes.

4. The method of claim 1, wherein if the dynamic quota value is above a maximum quota value, the maximum quota value is used as a value of the dynamic quota value, thereby ensuring that the number of consumer nodes connected to the resource node is bounded.

5. A non-transitory computer-readable storage medium tangibly encoded with computer-executable instructions, that when executed by a computing device associated with a resource node, performs a method comprising:
periodically computing, by the resource node, a dynamic quota value associated with a channel-swarm in a peer-to-peer network that is dynamically updated based on current connectivity values of each channel in the channel-swarm that are independent from connectivity conditions of the peer-to-peer network, said channel-swarm comprising a plurality of nodes, a portion of said plurality functioning as consumer nodes and a portion functioning as resource nodes, said resource node providing content to said one or more consumer nodes in the channel-swarm according to said dynamic quota value, said dynamic quota value comprising an indication of an acceptable number of connections between the resource node and the one or more consumer nodes, said resource node being a node in the peer-to-peer network that has contributable available bandwidth for said channel swarm, said resource node does not consume real-time multimedia content in said channel swarm,
said computing the dynamic quota value comprising:
reducing the dynamic quota value upon a determination that at least one of the connections between the resource node and any one of the consumer nodes is a bad connection, the quota reduction further comprising:
determining a step down value from the dynamic quota value, and
updating the dynamic quota by the step down value, and
increasing the dynamic quota value upon a determination that no bad connection with any of the consumer nodes has been encountered during a predefined time interval prior to the increasing of the dynamic quota value, the quota increase further comprising:
determining a step up value from the dynamic quota value; and
updating the dynamic quota value by the step up value; and
allocating, via the resource node, an available upload bandwidth to the one or more of the consumer nodes based on the dynamic quota value.

6. The non-transitory computer-readable storage medium of claim 5, wherein allocating the available upload bandwidth includes:
accepting a connection request from a consumer node if the dynamic quota value is not filled out; and
rejecting a connection request from a consumer node if the dynamic quota value is filled out.

7. The non-transitory computer-readable storage medium of claim 5, wherein if the dynamic quota value is below a minimum quota value, the minimum quota value is used as a value of the dynamic quota value, wherein the minimum quota is equal to or greater than one, thereby preventing the resource node from not servicing at least one of the consumer nodes.

8. The non-transitory computer-readable storage medium of claim 5, wherein if the dynamic quota value is above a maximum quota value, the maximum quota value is used as a value of the dynamic quota value, thereby ensuring that the number of consumer nodes connected to the resource node is bounded.

9. A system comprising:
a processor;
a non-transitory computer-readable storage medium for tangibly storing thereon program logic for execution by the processor, the program logic comprising:
logic executed by the processor for periodically computing a dynamic quota value associated with a channel-swarm in a peer-to-peer network that is dynamically updated based on current connectivity values of each channel in the channel-swarm that are independent from connectivity conditions of the peer-to-peer network, said channel-swarm comprising a plurality of nodes, a portion of said plurality functioning as consumer nodes and a portion functioning as resource nodes, said resource node providing content to said one or more consumer nodes in the channel-swarm according to said dynamic quota value, said dynamic quota value comprising an indication of an acceptable number of connections between the resource node and the one or more consumer nodes, said resource node being a node in the peer-to-peer network that has contributable available bandwidth for said channel swarm, said resource node does not consume real-time multimedia content in said channel swarm, said computing the dynamic quota value comprising:
logic executed by the processor for reducing the dynamic quota value upon a determination that at least one of the connections between the resource node and any one of the consumer nodes is a bad connection, the quota reduction further comprising:
logic executed by the processor for determining a step down value from the dynamic quota value, and
logic executed by the processor for updating the dynamic quota by the step down value, and
logic executed by the processor for increasing the dynamic quota value upon a determination that no bad connection with any of the consumer nodes has been encountered during a predefined time interval prior to the increasing of the dynamic quota value, the quota increase further comprising:
logic executed by the processor for determining a step up value from the dynamic quota value; and
logic executed by the processor for updating the dynamic quota value by the step up value; and
logic executed by the processor for allocating an available upload bandwidth to the one or more of the consumer nodes based on the dynamic quota value.

10. The system of claim 9, further comprising:
logic executed by the processor for accepting a connection request from a consumer node if the dynamic quota value is not filled out; and
logic executed by the processor for rejecting a connection request from a consumer node if the dynamic quota value is filled out.

11. The system of claim 9, wherein if the dynamic quota value is below a minimum quota value, the minimum quota value is used as a value of the dynamic quota value, wherein the minimum quota is equal to or greater than one, thereby preventing the resource node from not servicing at least one of the consumer nodes.

12. The system of claim 9, wherein if the dynamic quota is above a maximum quota value, the maximum quota value is used as a value of the dynamic quota value, thereby ensuring that the number of consumer nodes connected to the resource node is bounded.

\* \* \* \* \*